United States Patent [19]
Park

[11] 3,885,460
[45] May 27, 1975

[54] PISTON RING GROOVE FOR FLUOROCARBON SEAL RINGS

[75] Inventor: Kwang H. Park, Dayton, Ohio

[73] Assignee: General Motors Corporation, Detroit, Mich.

[22] Filed: Mar. 2, 1973

[21] Appl. No.: 337,377

[52] U.S. Cl. .................... 92/249; 92/138; 277/178; 417/269
[51] Int. Cl. ............................ F16j 1/02; F16j 9/00
[58] Field of Search ...... 92/138, 248, 249; 277/166, 277/167, 178, 189, 213, 215; 417/269

[56] References Cited
UNITED STATES PATENTS

| | | | |
|---|---|---|---|
| 2,782,801 | 2/1957 | Ludwig | 92/249 X |
| 2,895,773 | 7/1959 | McConnaughey | 277/178 X |
| 3,030,753 | 4/1962 | Pennington | 92/249 X |
| 3,057,545 | 10/1962 | Ransom et al. | 417/269 |
| 3,212,411 | 10/1965 | Storms | 92/248 |

Primary Examiner—Irwin C. Cohen
Attorney, Agent, or Firm—Edward P. Barthel

[57] ABSTRACT

An air conditioning axial compressor having a double-acting piston and ring assembly arranged with a piston groove adjacent each piston head end. The piston groove configuration includes front and rear asymmetrically spaced, annular V-shaped ridges together with annular recesses at each radial side wall of the groove such that the groove receives a resilient fluorocarbon resin seal ring therein formed into an arcuate section upon being snapped into the groove and urged into place wherein the ring's inner peripheral surface is penetrated in a sealed manner by the ridges to compensate for any lack of concentricity between the groove and the piston. The front ridge is located closer to the groove medial transverse plane, thereby allowing the ring leading edge to be received into the groove front recess an amount sufficiently below the outer diameter of the piston to insure ready piloting of the piston heads into their associated aligned cylinder bores.

1 Claim, 4 Drawing Figures

PATENTED MAY 27 1975 3,885,460

PISTON RING GROOVE FOR FLUOROCARBON SEAL RINGS

This invention relates to air conditioning reciprocating compressors and, more particularly, to a piston groove and ring assembly for an axial compressor having a double-acting piston.

An object of the invention is to provide ready assembly of the pistons into their cylinder blocks. The piston groove configuration includes front and rear annular V-shaped ridges asymmetrically spaced with respect to the groove medial transverse plane whereby the ring, upon being snapped into the groove assumes an arcuate section. Upon being rolled into place the ridges penetrate the outwardly concave inner peripheral surface of the ring in a sealed manner while the ring side edges, which are initially spaced from the groove radial side walls, are rolled into their respective recesses below the outer diameter of the piston to insure a smooth leading edge for piloting into the cylinder bore.

Another object is to provide piston ring and groove assembly with a snap ring of fluorocarbon resin material in combination with a groove configuration having a pair of asymmetrically spaced circumferential V-shaped ridges intermediate circumferential recesses at each of the groove radial side walls whereby the ridges by penetrating the seal ring serve to compensate for any out-of-concentricity between the groove diameter and the piston outer diameter.

Further objects and advantages of the present invention will be apparent from the following description and drawings for a preferred embodiment in which.

Figure 1:
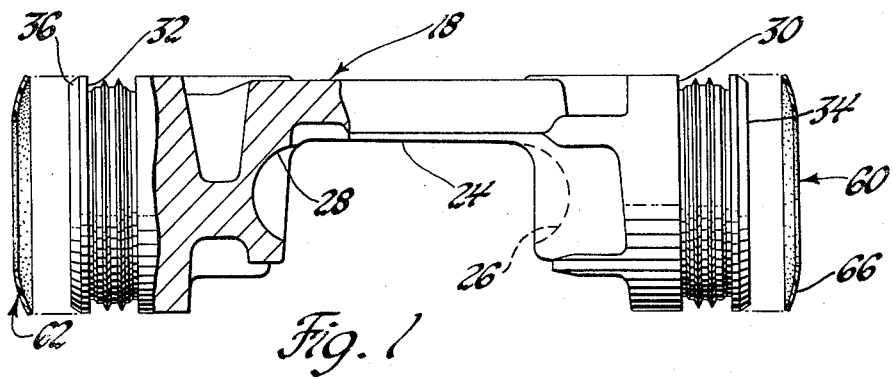
FIG. 1 is an elevational view of the double-acting piston with parts broken away.

Referring now to the drawings, numerals 10 and 12 generally indicate the front and rear cylinder halves or blocks, respectively, of an air conditioning axial compressor which, as illustrated, is of the axially opposed type. The compressor cylinder blocks 10 and 12 include opposed cylinder bores 14 and 16, in which is reciprocally disposed a double-acting piston 18. One form of such an air conditioning compressor is disclosed in U.S. Pat. No. 3,057,545 issued Oct. 9, 1962, to G. P. Ransom et al., and assigned to the assignee of the instant application the disclosure of which is incorporated by reference herein. While the Ransom et al compressor has three horizontal double-acting pistons located 120° apart, making a six cylinder arrangement, it is to be understood that applicant's invention could also be used with compressors employing a single-acting reciprocating piston.

The pair of cylinder blocks 10 and 12 are supported within an outer shell (not shown) while the double-acting piston 18 reciprocates in response to rotation of a shaft (not shown) in aligned shaft bores 20 and 22. The piston has a central part of its one side cut away, as shown at 24, so as to straddle the outer edge of a swash plate (not shown) such that rotation of the swash plate causes reciprocation of the piston in a manner described in the Ransom et al., patent. Ball sockets 26 and 28 are formed in the piston elements such that ball bearings located therein (not shown) can bear against the swash plate.

The double-acting piston 18, which is preferably formed of aluminum cast material, has sealing ring grooves 30 and 32 located adjacent the opposed piston heads 34 and 36, respectively. As the ring grooves 30 and 32 are mirror images of each other only the right hand groove 30 will be described in detail with all remarks being applicable to the left hand groove 32.

Figure 2:
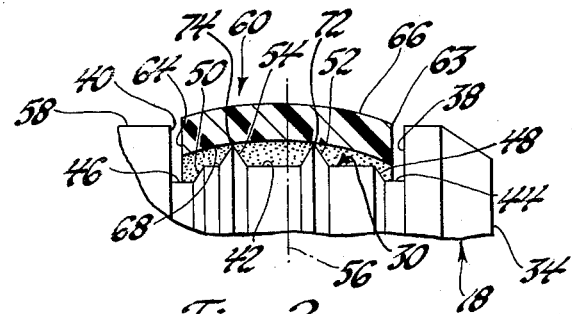
FIG. 2 is an enlarged view of the piston groove and ring assembly prior to the ring being rolled into place.

As best shown in FIG. 2, the groove 30 is formed with front 38 and rear 40 radially extending spaced groove side walls and a bottom wall 42. The bottom wall 42 has circumferential valleys or recesses 44 and 46 as continuations of groove radial side walls 38 and 40. The groove recesses 44, 46 have axially inwardly and upwardly sloping inner side walls 48 and 50 respectively, defining the groove bottom or base wall 42 therebetween. The groove base wall 42 has front 52 and rear 54 V-shaped or sectioned circumferential ridges formed thereon. As seen in FIG. 2 the ridges 52 and 54 are asymmetrically oriented on the base wall 42 in relation to the transverse medial plane 56 such that the front ridge 52 is located just forward of and adjacent to the medial plane while the rear ridge 54 is located about half way between the transverse medial plane 56 and the rear radial side wall 40 of the groove 30.

In the preferred form the outer diameter of the piston cylindrical wall surface 58 has a diameter of the order of 1.497 inches while the diameter of the groove base wall 42 is of the order of 1.446 inches such that the depth of the groove is of the order of 0.025 inches. As the diameter of the peaks of the ridges 52 and 54 is about 1.476 inches it will be appreciated that the height of the ridges above the bottom wall 42 is about 0.015 inches and the peaks of the ridges are therefore recessed about 0.010 inches below the cylindrical walls 58 of the piston. Therefore the peaks of each of the ridges 52 and 54 are preferably located more than halfway or more precisely about 3/5 of the radial distance between the base wall 42 and the outer surface or diameter 58 of the piston. In the disclosed form the axial distance from the peak of the front ridge 52 to the front side wall 38 is of the order of 0.060 inches while the axial distance from the peak of the rear ridge 54 to the rear side wall 40 is about 0.043 inches.

It will be noted in FIG. 1 that a continuous annular washer-like seal ring is provided for each of the piston grooves 30 and 32 respectively, such that when the rings 60 and 62 are snapped in place in their associated grooves, as seen in FIG. 2 for groove 30, the seal ring 60 has a substantially arcuate cross section with its ends 63 and 64 spaced a defined clearance distance from its associated groove radial end wall 38 and 40 respectively. Each snap ring 60 in the preferred form has a thickness of about 0.025 inches such that its outer convex peripheral surface 66 is initially located outwardly from piston surface 58.

Figure 3:
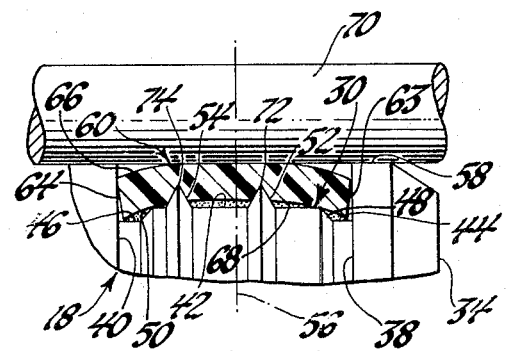
FIG. 3 is a view similar to FIG. 2 showing the position of the sealing ring configuration upon being rolled into place in the piston groove.
Figure 4:
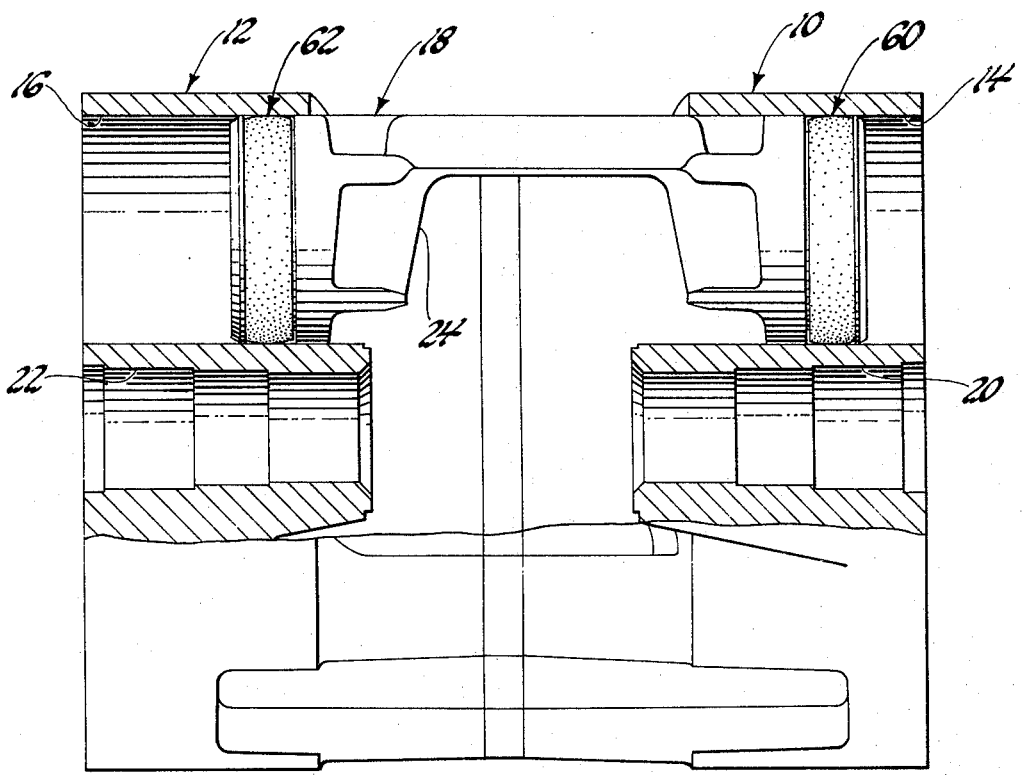
FIG. 4 is a partial fragmentary cross-sectional view of the compressor cylinder block showing a double-acting piston located therein.

As seen in FIG. 3, upon being rolled into the groove 30 the seal ring ends 63 and 64 are moved into juxtaposition with groove side walls 38 and 40 respectively, while its inner peripheral surface 68 is penetrated by the ridges 52 and 54 an amount sufficient to establish a seal therebetween. An important feature of applicant's invention is that the relative thickness of the seal ring 60 (0.025 inches) relative to the radial height of the spaced ridges 52 and 54 (0.015 inches) is such as to insure penetration of the crests 72 and 74 of the ridges 52 and 54 respectively, to an average circumferential location about half-way through the seal rings as indicated in the after-rolled position of FIG. 3 for the seal ring 60. In the instant form of the invention wherein a maximum permissible out-of-concentricity tolerance is about 0.005 inches it will be appreciated that the seal ring 60 will be penetrated by the ridges 52 and 54 more on one side and less on the other side upon being rolled into place by a series of axial rollers one of which is shown at 70, whose reference surface during the rolling operation is the outer diameter 58 of the piston 18. Thus, under the instant tolerance conditions the ridge crests 72 and 74 will penetrate on the order of 0.010 to 0.020 inches into the seal rings 60 to thereby insure inner periphery 68 sealing conditions without diminishing the effectiveness of the seal ring's outer periphery 66.

Also during the rolling-to-size operation the front recess 44 and the asymmetrical positioning of the ridge 52 adjacent to the medial plane 56 will allow the ring forward end 63 to snap-in further down the groove recess 44 to establish a leading edge at both head ends 34 and 36 of the double-acting piston for ready assembly into their respective cylinder bores 14 and 16. It should be further noted that the initial axial dimension, as shown in FIG. 2, for the disclosed form is about 0.150 inches while the axial dimension of the groove 30 between radial walls 38 and 40 is about 0.160 inches, thereby providing a clearance between the ring ends 63 and 64 and their respective groove side walls 38 and 40. This initial clearance allows the ring sufficient freedom to be rolled into the position shown in FIG. 3 wherein the ring ends 63 and 64 are located in juxtaposition with the groove radial side walls 38 and 40.

Each of the rings 60 and 62 are made from a fluorocarbon resin material which in the disclosed form is polytetrafluoroethylene (PTFE) filled by graphite to an amount approximately 10 percent by weight of the rings. The rings operate to provide a seal between the cylinder wall and the piston in order to prevent, as much as possible, passage of refrigerant exhaust gases around the outer periphery of the piston.

Although the rings 60 and 62 in their preassembled form preferably have a rectangular cross section if molded individually it has been found that in actual production the rings may be formed by being sliced from a tubular member. As a result the rings may have a slight preformed conical shape, as viewed in FIG. 1, and in this instance it is important that the rings be assembled with this preformed conical surface 66 positioned outwardly from the piston head. This is to insure that if the seal rings have such a preformed conical shape it will assist the ridges 52 and 54 in establishing the configuration of FIG. 2 wherein the inner peripheral surface 68 will be outwardly concave and the outer peripheral surface 66 will be outwardly convex.

It should be noted that with the disclosed form the seal rings have an inner diameter, in their preassembled form of FIG. 1, of about 1.215 inches and an outer diameter substantially equal to the outer diameter of the piston, while the piston has an outer diameter of about 1.497 inches and the groove bottom wall has a diameter of about 1.446 inches.

While the embodiment of the present invention as herein disclosed constitutes a preferred form, it is to be understood that other forms might be adopted.

I claim:

1. In combination with an air conditioning compressor having front and rear cylinder blocks provided with a pair of opposed axially aligned cylindrical bores, a double-acting piston assembly installed for reciprocation in said pair of cylindrical bores comprising, a cylindrical double-acting piston having a peripheral groove adjacent each piston head, each said peripheral groove including front and rear radially extending spaced side walls and a bottom wall, front and rear annular recesses recessed below each end of each said bottom wall and defining said bottom wall therebetween, front and rear V-sectioned ridges asymmetrically located on the periphery of each said bottom wall, said front ridge located forward of and adjacent to the medial transverse plane of its associated groove, said rear ridge located about half-way between said medial transverse plane and said groove rear side wall, the V-sectioned ridges having their peaks radially located substantially intermediate said bottom wall and the outer diameter of the piston, an elastic flexible seal ring received in each of said grooves, each said seal ring being a continuous annular member of polytetrafluorethylene material having an arcuate cross-section, each said seal ring normally in the form of a washer having smooth inner and outer peripheral surfaces, each said seal ring having a thickness substantially equal to the radial depth of its groove measured between the diameter of the groove bottom wall and the diameter of said piston, the seal rings being positioned in their respective grooves with each seal ring outer smooth surface referenced substantially flush with the piston diameter and each seal ring forward and rear edge being positioned adjacent its associated groove radial side wall, said V-sectioned ridges of each groove penetrating the inner peripheral smooth surface of its associated seal ring an amount sufficient to seat the rings therein in a sealed manner such that each seal ring maintains a generally arcuate shape in cross section, and the asymmetrical positioning of the groove V-sectioned ridges insures that the front and rear edges of each seal ring is received into its associated groove front and rear annular recesses an amount sufficient to define a clearancce between the forward portion of the seal rings and the outer diameter of the piston to insure that each of the piston heads will be readily received into their associated opposed cylindrical bores.

* * * * *